United States Patent
Dabral et al.

[11] Patent Number: 6,154,498
[45] Date of Patent: *Nov. 28, 2000

[54] COMPUTER SYSTEM WITH A SEMI-DIFFERENTIAL BUS SIGNALING SCHEME

[75] Inventors: Sanjay Dabral, Milpitas; Dilip K. Sampath, Sunnyvale; Alper Ilkbahar, Santa Cruz, all of Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/938,359

[22] Filed: Sep. 26, 1997

[51] Int. Cl.[7] .............................. H04B 3/00; H04L 23/00; H04L 27/00; H03K 3/00

[52] U.S. Cl. .................. 375/257; 375/377; 375/259; 375/354; 327/297; 327/291; 327/141

[58] Field of Search ................................ 375/257, 219, 375/220, 377, 259, 285, 354, 346, 316, 359, 356; 326/21, 22; 327/379, 551, 297, 295, 296, 291, 144, 141; 455/296

[56] References Cited

U.S. PATENT DOCUMENTS

5,864,253  1/1999  Katakura et al. ..................... 327/297

OTHER PUBLICATIONS

Gunning et al., "A CMOS Low–Voltage–Swing Transmission–Line Transceiver," Proceedings of 1992 IEEE International Solid–State Circuits Conference, pp. 58–59 (1992).

*Primary Examiner*—Stephen Chin
*Assistant Examiner*—Betsy L. Deppe
*Attorney, Agent, or Firm*—Blakely, Sokoloff, Taylor & Zafman LLP

[57] ABSTRACT

A computer system with a semi-differential bus-signaling scheme is described. The computer system includes a transmitter coupled to a common bus. The transmitter sends clock signals and a data signal to logic-comparing devices within a receiver. The logic-comparing devices compare the data signal to a reference voltage while comparing the clock signals to each other. After the comparison, the clock signals can be used to capture the data into a retiming circuit.

15 Claims, 7 Drawing Sheets

Figure 1:
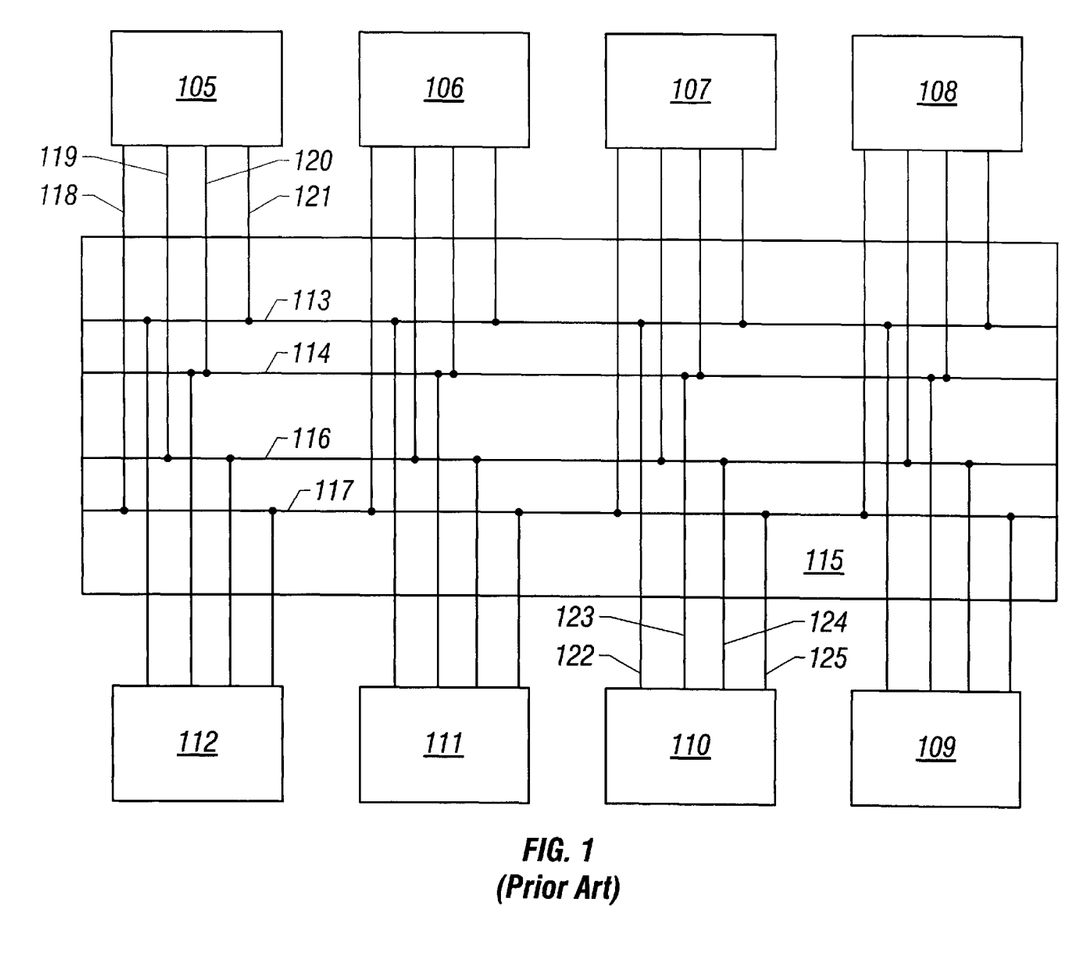
FIG. 1 illustrates a block diagram of a conventional computer system with a common bus to which a plurality of transmitter/receivers are connected.

FIG. 7D ized as transmitter/receivers (Tx/Rxs) 105–112. Each Tx/Rx 105–112 is connected to traces 113, 114, 116, and 117 in a common bus 115 by four lines (e.g., 118–121). The traces 113 and 114 represent lines in the bus that are solely dedicated to transporting data. Larger amounts of data could be transported by increasing the number of data traces on the bus 115. The trace 116 is a line dedicated to transporting strobe signals, which are clock signals that are transmitted simultaneously or have a predetermined delay with the data signals. The inverse of the strobe signals (strobe*) are transported on the trace 117. Strobe and strobe* signals are used to time-synchronize data appearing as pulses at the receivers 105–112. The strobe signal and strobe* signal are generated by the transmitter and are often implemented to avoid the data received from having to wait for a master common clock (i.e., a main clock signal for the computer system).

COMPUTER SYSTEM WITH A SEMI-DIFFERENTIAL BUS SIGNALING SCHEME

BACKGROUND OF THE INVENTION

1. Field of the Invention

The invention relates in general to the field of computing and, more particularly, to buses used in computing. Specifically, the invention relates to a semi-differential bus signaling scheme where the data is referenced to $V_{ref}$ and the clock is differential.

2. Description of the Related Art

Modern computer systems may contain several microprocessors and microcontrollers connected to each other by a bus. The bus transports data among the microprocessors and other components. The bus is a complex conglomeration of electrical circuits called traces. Traces are wire-like connections that are printed on the top and bottom of a printed circuit board. The number of traces in a bus may give an indication of the size/width of the bus.

FIG. 1 illustrates a computer system with several microprocessors and controllers generally identified as transmitter/receivers (Tx/Rxs) 105–112. Each Tx/Rx 105–112 is connected to traces 113, 114, 116, and 117 in a common bus 115 by four lines (e.g., 118–121). The traces 113 and 114 represent lines in the bus that are solely dedicated to transporting data. Larger amounts of data could be transported by increasing the number of data traces on the bus 115. The trace 116 is a line dedicated to transporting strobe signals, which are clock signals that are transmitted simultaneously or have a predetermined delay with the data signals. The inverse of the strobe signals (strobe*) are transported on the trace 117. Strobe and strobe* signals are used to time-synchronize data appearing as pulses at the receivers 105–112. The strobe signal and strobe* signal are generated by the transmitter and are often implemented to avoid the data received from having to wait for a master common clock (i.e., a main clock signal for the computer system).

When the Tx/Rx 105 transmits data to the Tx/Rx 110, the Tx/Rx 105 takes control of the bus (i.e., become the bus master). The Tx/Rx 105 then places the data on its data lines 120–121. Since these lines are connected to the data traces 113–114 of the bus 115, the data from the Tx/Rx 105 is placed on the bus 115. Similarly, a clock signal is sent to the bus 115 from the Tx/Rx 105 on the line 119 and an inverted clock signal (clock*) is sent on the line 118. The Tx/Rx 110 is also connected to the common bus 115 by the lines 122–125. The clock signal on the line 124 and the clock* signal on the line 125 enable the Tx/Rx 110 to receive the data during a transition of the clock signal.

Typically, signals transmitted within a given computer system experience noise. One source of noise is "ground bounce," which is the shifting of a voltage level designated as ground. "Ground bounce" can cause other signals that are referenced to ground to fluctuate. Other sources of noise include "cross talk" and power supply "dips". Typically, digital components are designed with a specific noise margin. If the voltage levels of the signals go outside the noise margin, the device may not function properly. Thus, it is beneficial to minimize the amount of noise present in order to increase the likelihood of operating a given device within its designated noise margin.

Figure 2:
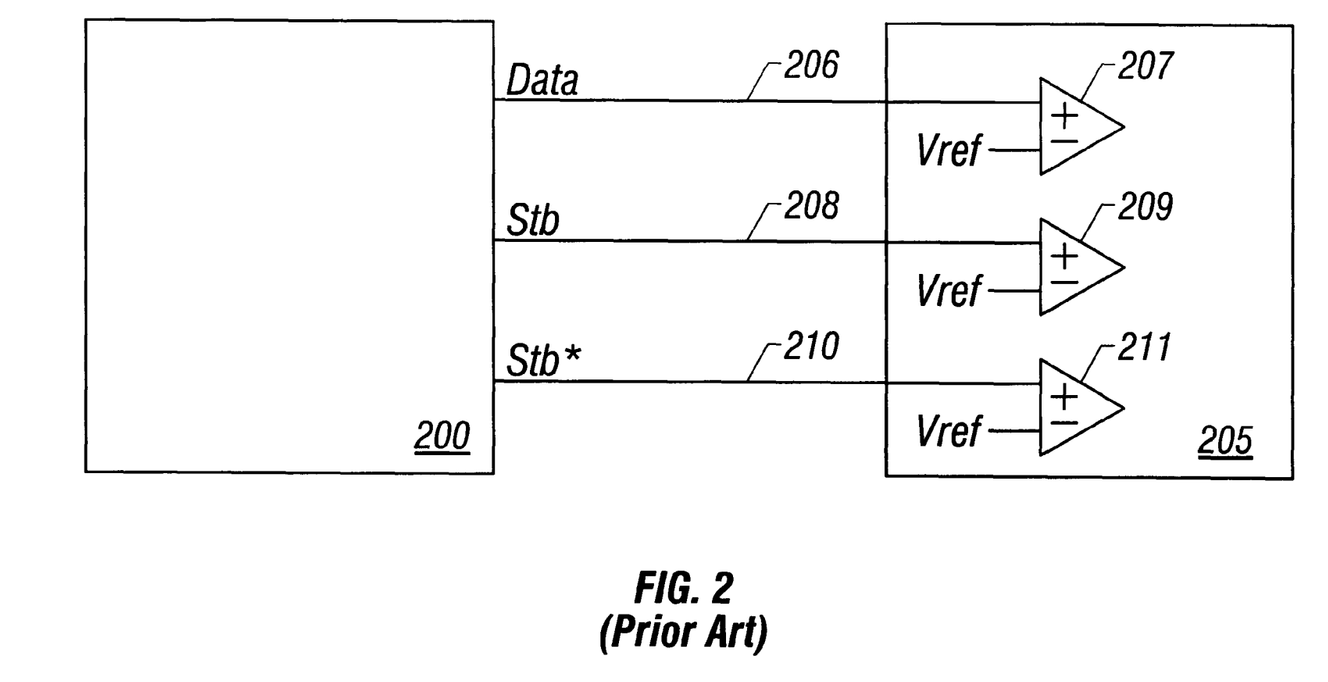
FIG. 2 is an enlarged view of two of the transmitter/receivers shown in FIG. 1.

FIG. 2 illustrates a conventional trip point detection system that uses a pseudo-differential bus signaling scheme. A data signal, clock signal, and clock* signal are transmitted from a Tx/Rx 200 to a Tx/Rx 205 by the bus traces 206, 208, and 210, as shown. The Tx/Rx 205 includes three differential amplifiers 207, 209, 211. The differential amplifier 207 compares the voltage level of the data signal on the trace 206 to a reference voltage level. If the voltage level of the data signal is higher than the reference voltage level, the differential amplifier 207 identifies the signal as being in a "high" state. Similarly, if the voltage level of the data signal is less than the reference voltage level, the data signal is designated as being in a "low" state. The clock signal and the clock* signal are similarly compared to the reference voltage by the amplifiers 209 and 211, respectively.

By comparing the signals at the Tx/Rx 205 to a reference voltage, a "good" trip point can be determined. When the noise is within the noise margin, the voltage level of the output signal does not change spuriously. If noise within the noise margin is added to a signal designated as a "low," the voltage level of the additional noise does not cause the total voltage level of the signal to exceed the reference voltage. Thus, the state of the signal, even though it includes noise, remains "low."

Figure 3:
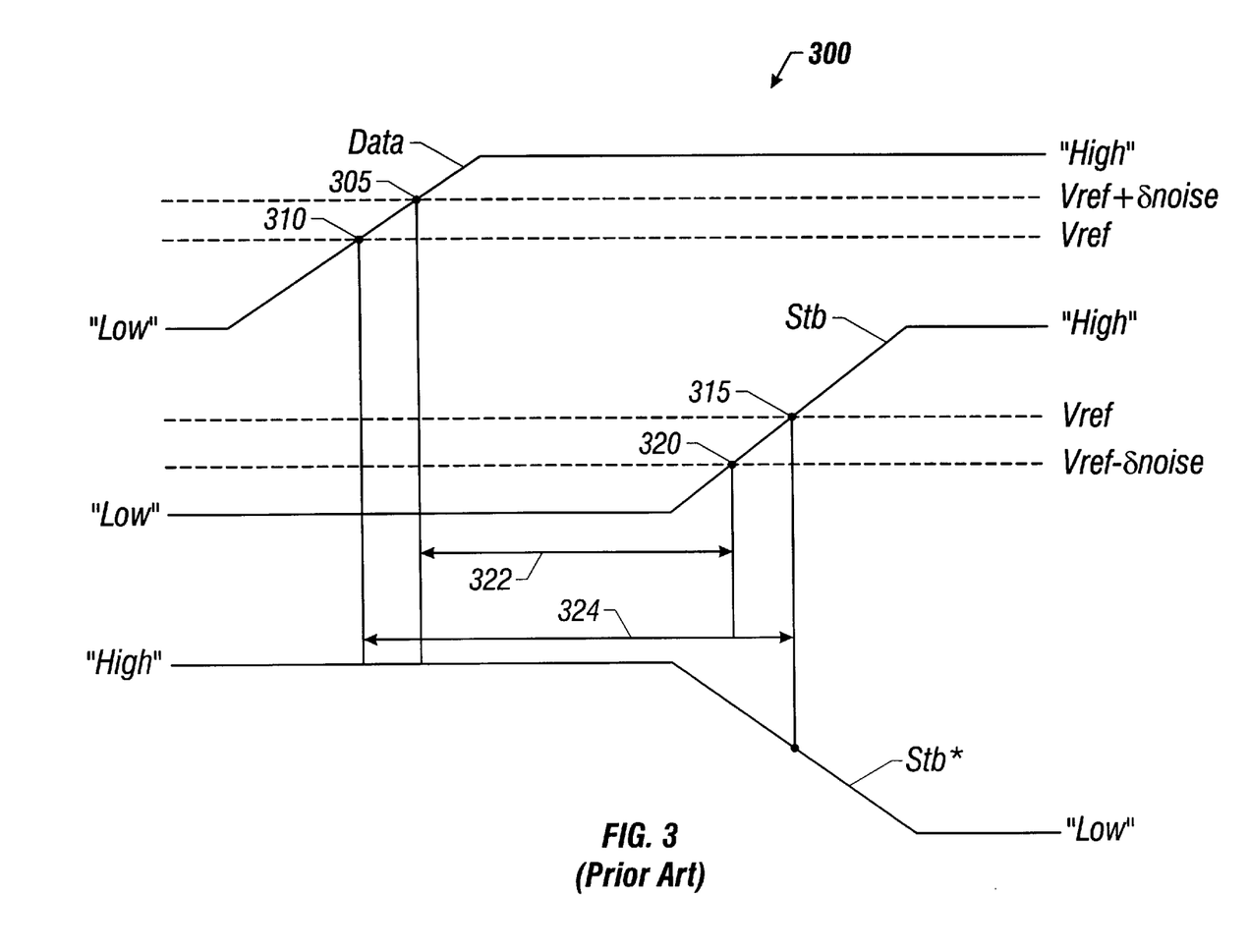
FIG. 3 illustrates the timing diagrams for one of the transmitter/receivers in FIG. 2.

Ideally, $V_{ref}$ remains constant throughout the operation of the device because it is a DC (i.e., direct current) signal. In reality, a small AC (i.e., alternating current) component of $V_{ref}$ causes it to fluctuate. Since $V_{ref}$ is the trip point for the differential amplifiers 207, 209, and 211, the shifting of $V_{ref}$ causes the trip point to shift. For example, if $V_{ref}$ shifts high as shown at position 305, the trip point of the data would generally be higher, causing the data to be received at a later time. The presence of noise indicated by the shifting of $V_{ref}$ can become more problematic when the transition time of the inputs to the differential amplifiers 207, 209, 211 is very slow (i.e., the slope of the signal is not steep). The strobe signal and the strobe* signal experience the same kind of fluctuations resulting from fluctuations in $V_{ref}$.

FIG. 3 illustrates the timing diagrams at the Tx/Rx 205 for the output signals of the amplifiers 207, 209, and 211 (time is increasing from left to right in each of the diagrams). An output data signal 300 is defined with respect to the reference voltage $V_{ref}$. A noise factor labeled $\delta_{noise}$ is representative of the collection of noise terms that are present. The noise factor $\delta_{noise}$ includes ground bounce, cross-talk (i.e., the influencing of one signal by another signal), power supply dips, and intersymbol interference (i.e., the presence of previous data influencing present data). Since the noise is assumed to be symmetric, the maximum and minimum levels of the output signal are $V_{ref+\delta noise}$ and $V_{ref-\delta noise}$, respectively.

As shown in FIG. 3, a nominal (i.e., ideal) data window is defined from the ideal $V_{ref}$ position 310 on the data signal to the ideal $V_{ref}$ position 315 on the strobe signal. The nominal data window 324 is defined as the window of time in which valid data can be received. Fluctuations of $V_{ref}$ resulting from noise can cause the size of the data window to be reduced significantly even though a pseudo-differential bus signaling scheme is used. For example if $V_{ref}$ jumps to position 305 on the data signal and position 320 on the strobe signal, the resulting effective data window 322 is considerably smaller than the nominal data window 324. The effective data window 322 has suffered reductions resulting from the noise in both of the strobe signals and the data signal.

Thus, it would be beneficial to have a bus signaling scheme that could reduce the noise present in a signal and is capable of overcoming the shortcomings of conventional methods.

SUMMARY OF INVENTION

The present invention relates to a computer system with a semi-differential bus signaling scheme. The invention includes a transmitter coupled to a common bus. The transmitter sends clock signals and a data signal to logic-comparing devices within a receiver. The logic-comparing devices compare the data signal to a reference voltage while comparing the clock signals to each other. After the comparison, the clock signals can be used to capture data into a retiming circuit.

BRIEF DESCRIPTION OF DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are described in detail. It should be understood, however, that the description herein of specific embodiments is not intended to limit the invention to the particular forms disclosed. On the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below as they might be employed in a computer system with a semi-differential bus signaling scheme. In the interest of conciseness, not all features of an actual implementation are described in this specification. It will of course be appreciated that in the development of any actual embodiment, numerous implementation-specific decisions must be made to achieve the developer's specific goals, such as compliance with system-related and business-related constraints. Moreover, it will be appreciated that even if such a development effort might be complex and time-consuming, it would nevertheless be a routine undertaking for one of ordinary skill having the benefit of this disclosure.

Overview

The present invention provides for the efficient operation of a bus in a noisy environment without significantly increasing the system costs. Since both the clock signal and the inverted clock signal are generated by the transmitter, both tend to experience the same type of noise. Comparing the clock signal to the inverted clock signal enables a considerable amount of the common mode noise to be removed.

First Embodiment

Figure 4:
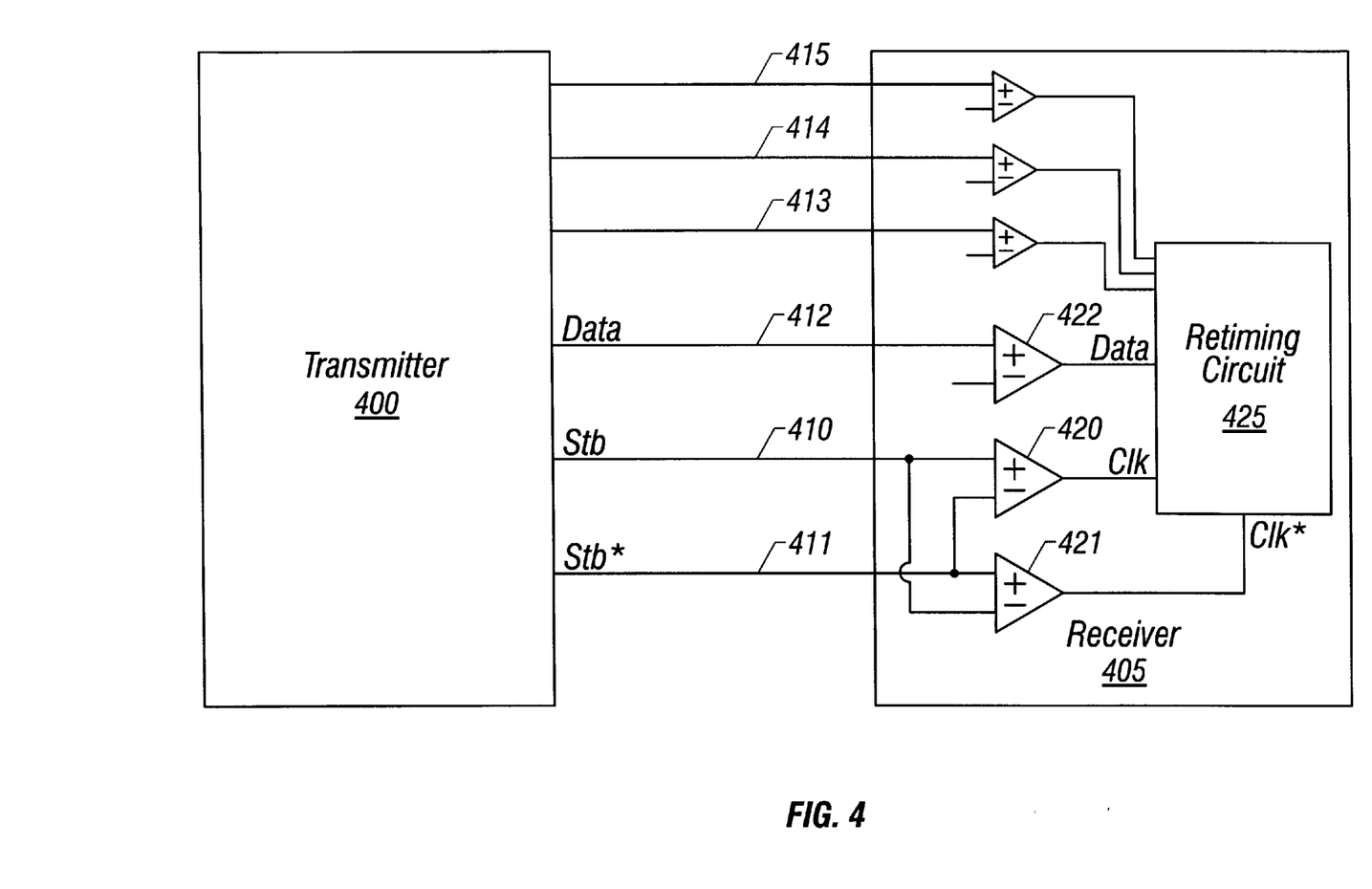
FIG. 4 illustrates a first embodiment of a transmitter/receiver pair of a computer system configured in accordance with the invention.

FIG. 4 illustrates a first embodiment of the invention, which includes a transmitter 400, a receiver 405, a clock signal bus trace 410, an inverted clock (clock*) signal bus trace 411, amplifiers 420–422, a retiming circuit 425 having inputs for data, clock, and inverted clock signals, and a data signal bus trace 412.

The transmitter 400 may be a microprocessor, a memory controller, a video controller, a peripheral component, a chipset, or the like. The transmitter 400 takes control (i.e., becomes the bus master) of the common bus (not shown). The details surrounding becoming a bus master have been omitted so as not to obscure the present invention since they are known to those skilled in the art. The transmitter 400 also has several lines (not shown) connecting it to the traces of the common bus. The transmitter 400 places a data signal, a corresponding clock signal, and an inverted clock signal on the bus traces 412, 410, and 411, respectively. As previously mentioned, the clock and clock* signals are signals that are used to synchronize data appearing at the receiver 405. The transmitter 400 may also include additional lines (not shown) that could be connected to the address signal lines, data signal lines, and control signal lines of the common bus.

The receiver 400 may be a microprocessor, a memory controller, a video controller, a memory device, a peripheral component, a chipset, or the like which is used as an input receiver. The clock signal, data signal, and clock* signal are transmitted to the receiver 405. The receiver 405 may also include additional lines (not shown) that could be connected to the address signal lines, data signal lines, and control signal lines of the common bus. The receiver 405 also includes the differential amplifiers 420–422.

The differential amplifiers 420–422 function as comparing logic (i.e., comparators). The amplifiers 420–422 compare the voltage level of the signals at its two inputs to generate an output. Comparing, as defined in this application, refers to contrasting the difference between the signal connected to the positive lead of the amplifier to the signal connected to the negative lead of the amplifier. When, for example, the strobe signal is connected to the positive lead and the strobe* signal is connected to the negative lead, the output of the amplifier will be "high" when the strobe signal is greater than the strobe* signal, and "low" when the strobe* signal is greater than the strobe signal.

The amplifier 422 compares the signal received on the data trace 412 to a reference voltage $V_{ref}$ and generates a reference data signal. One skilled in the art will appreciate that a multi-bit data signal generally requires multiple data traces (e.g., 413–415). Since the additional data traces will be connected similarly to the data trace 412, remaining figures only illustratively show the data trace 412. The amplifier 420 compares the strobe signal received on the strobe line 410 to the strobe* signal received on the line 411. The amplifier 421 compares the strobe* signal received on the line 411 to the strobe signal received on the line 410. FIG. 4 reflects the use of positive logic, but one skilled in the art will understand and appreciate that negative logic could also be used. The outputs of amplifiers 420–422 could be sent to a retiming circuit 425, delay matching circuit, register, memory cell, buffer circuit, or a combination of these. The retiming circuit can be used to arrange data from the input/output domain (i.e., the bus domain) to the core clock domain (i.e., the on chip domain).

Since both the strobe signal and the strobe* signal are generated in the transmitter 400, both generally experience the same types of noise. For example, if the "ground bounced" during the generation of the strobe signal, the same ground bounce would be experienced by the strobe* signal. By comparing these two signals, a significant amount of the common mode noise can be removed.

Figure 5:
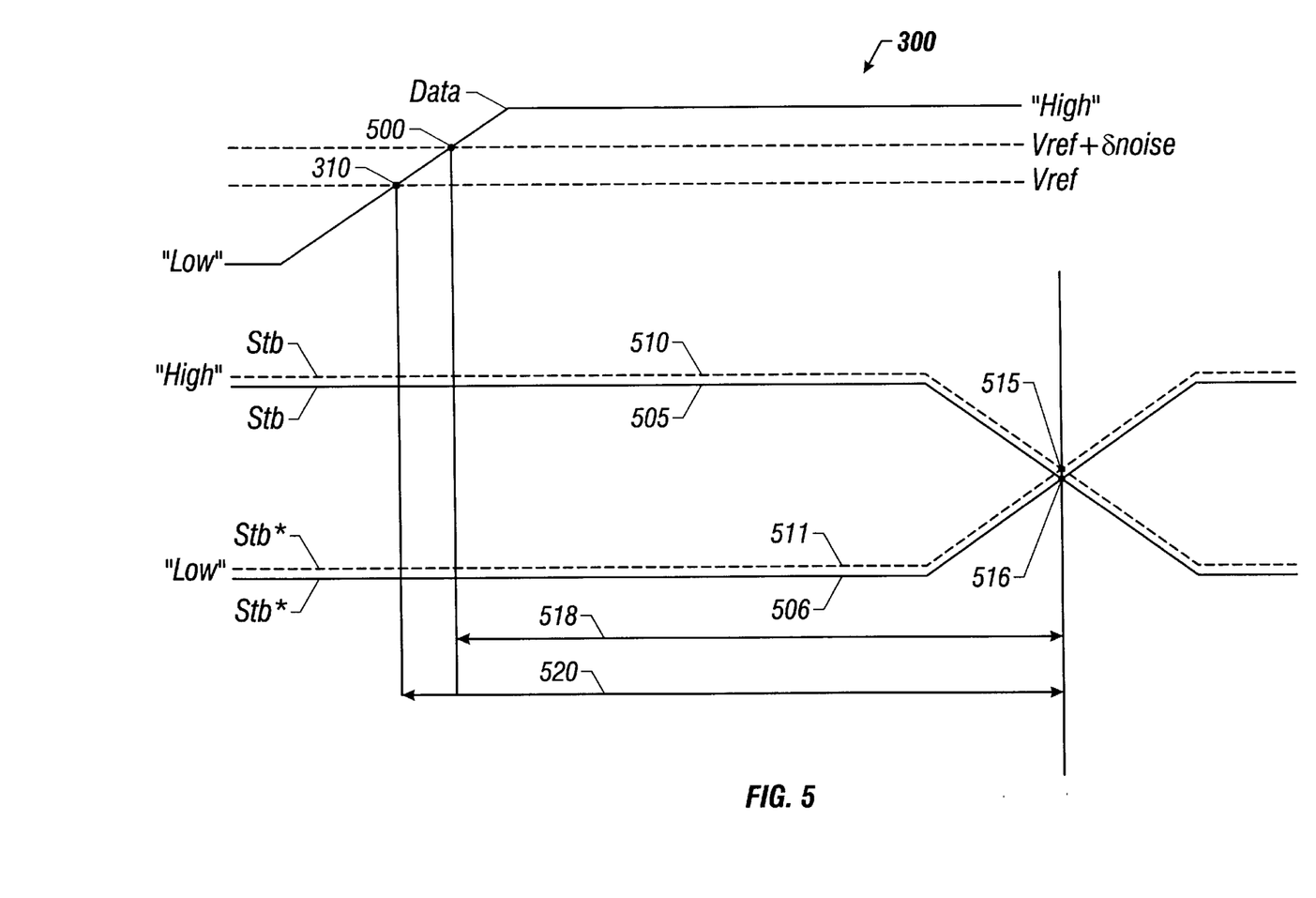
FIG. 5 illustrates timing diagrams for the transmitter/receiver pair of FIG. 4.

FIG. 5 illustrates timing diagrams for the signals present at the receiver 405 for a "low" to "high" data transistion. Conversely, a "high" to "low" transition could also be implemented. In this case, $V_{ref}$ jumps to a point 500 on the data signal and goes low during the generation of the strobe signal. The strobe signal 510 and the strobe* signal 511 represent ideal signals, which would trip differential amplifiers at the ideal $V_{ref}$ position 515. In the strobe signal 505, $V_{ref}$ has fallen below the ideal trip position because of noise. Since the negative shift on the strobe signal results in a positive shift on the strobe* signal, the strobe* signal 506 is greater than the ideal strobe* signal 511. The strobe signal 505 and strobe* signal 506 intersect at position 516. Thus, the point at which the strobe signal crosses the strobe* signal (labeled 516) is used as the trip point. This new trip point 516 is considerably closer to the ideal trip point 515. A resulting effective window 518 is considerably closer to the size of the nominal window 520. The portion of the nominal window 520 that was lost because of the noise in the strobe signal and strobe* signal for conventional techniques has been restored. The reduction of the noise present within the strobe signal and the strobe* signal increases the size of the noise margin (i.e., the amount of noise that can be tolerated without adversely affecting system operation).

Second Embodiment

Figure 6:
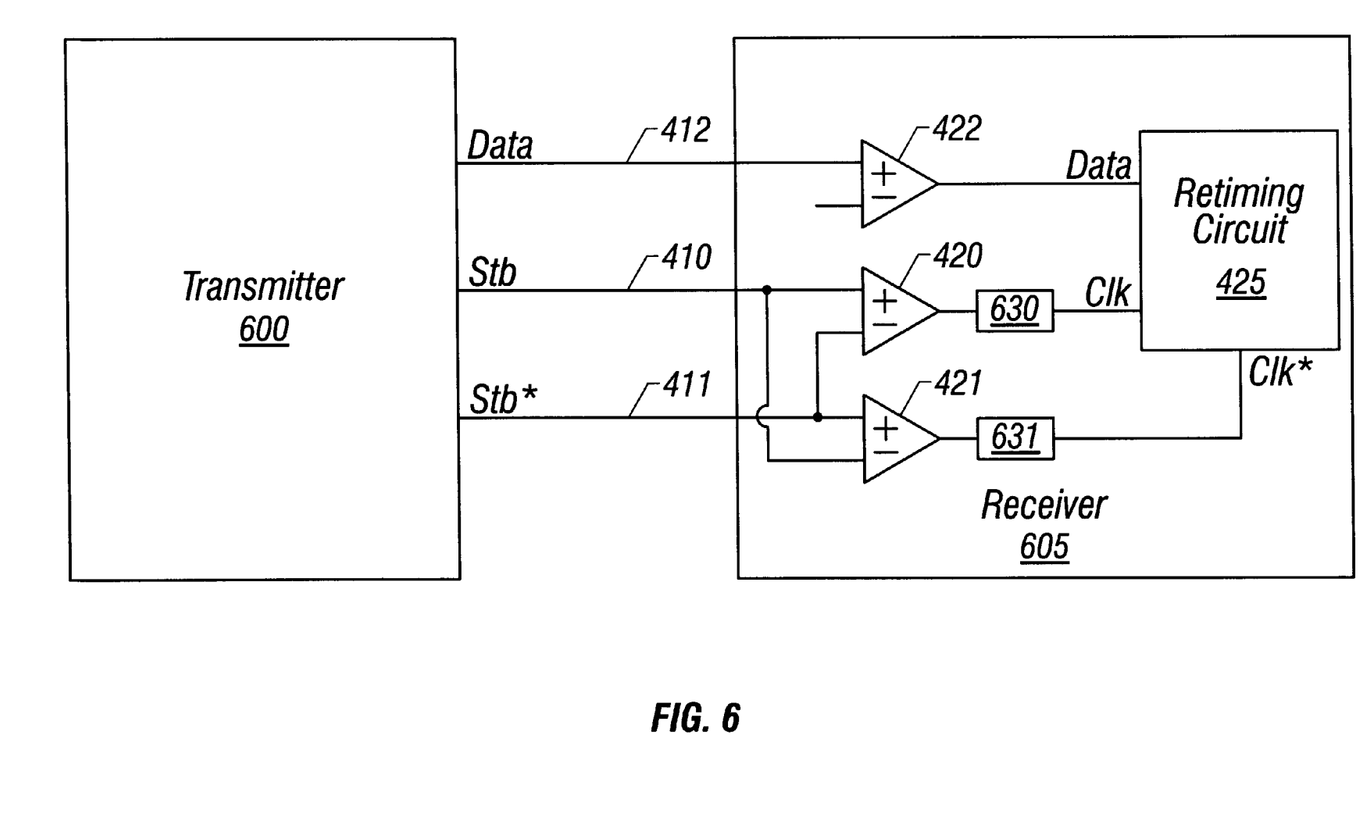
FIG. 6 illustrates a second embodiment of a transmitter/receiver pair of a computer system configured in accordance with the invention.

FIG. 6 illustrates a second embodiment, which includes a transmitter 600, a receiver 605, the strobe signal bus trace 410, the inverted strobe* signal bus trace 411, the amplifiers 420–422, the data signal bus trace 412, the retiming circuit 425 having inputs for data, clock, and inverted clock signals, and two reset capable latches 630 and 631. As indicated by the use of similar numbering, several components in this embodiment are functionally similar to the previous embodiment with the exception of the reset capable latches 630–631, the receiver 605, and the transmitter 600.

When a transmitter has taken control of the bus and executed the desired operation, it can relinquish control of the bus to some other transmitter. When relinquishing control, some transmitters place both the strobe signal and the strobe* signal in the same state (e.g., tri-state high as in a GTL+ scheme). In these instances, transmission of the strobe signal and the strobe* signal to the amplifiers within the receiver could result in unreliable output. To avoid this situation, this embodiment attaches reset capable latches 630–631 to each of the strobe-strobe* amplifiers 420–421. The reset capable latches 630–631 serve as feedback paths that "ignore" the differential amplifiers 420–421 when strobe and strobe* are in the same state and generate a reliable logic level and state that can be sent to another logic device (e.g., retiming circuit 425). Only when strobe and strobe* have been initiated by the transmitter 600 and placed appropriately does the differential amplifiers 420–421 have enough strength to toggle the reset capable latches 630–631.

Figure 7A:
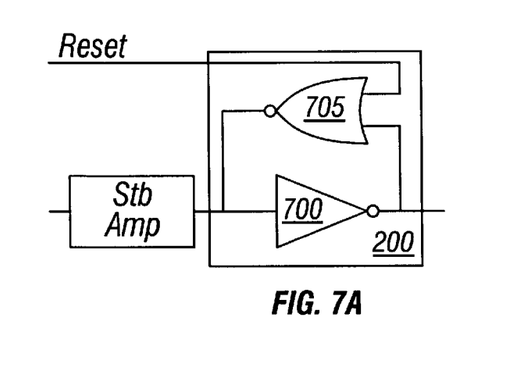
FIGS. 7A–7D are enlarged views of embodiments of the latching circuit of FIG. 6.
Figure 7B:
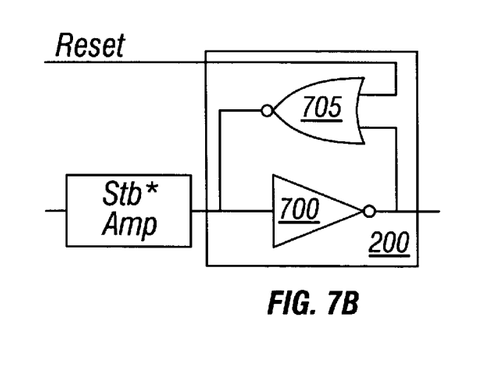
Figure 7C:
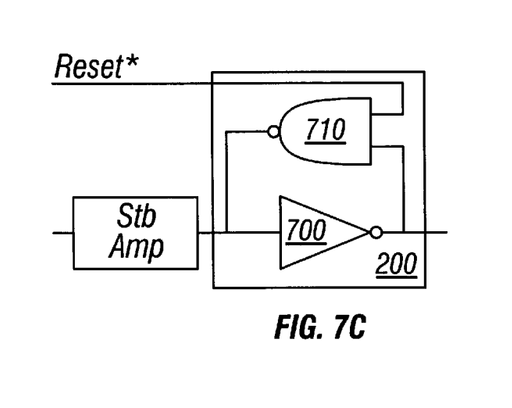
Figure 7D:
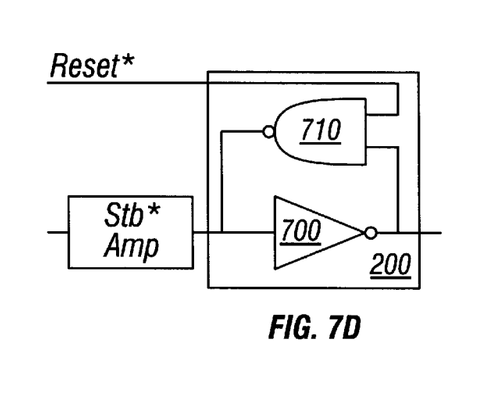

One possible configuration for the latching circuits 630–631 is shown in FIGS. 7A and 7B. The output of the strobe or strobe* amplifier enters an inverter 700, which is fed back through a NOR gate 705 to the input of the inverter 700. The strobe-strobe* amplifier of FIG. 7 can be either the amplifier 420 or the amplifier 421, which allows the latching circuit to be either the latching circuit 630 or 631, respectively. A RESET signal is connected to a second input of the NOR gate 705. One skilled in the art will appreciate that the reset signal can be set at either system power up or when pressed by an operator. If the NOR gate enable signal and the output of the inverter 700 are both "low" then the output of the NOR gate 705 is a "high". This "high" output generates a low output signal when entering inverter 700. In this instance, the strobe-strobe* amplifier is bypassed because of this feedback path. When the state of the strobe and strobe* signals change, the NOR gate enable signal will no longer be enabled. This allows the output of the strobe-strobe* amplifier to pass through the latching circuit. FIGS. 7C and 7D illustrate an alternative embodiment for the reset capable latch implemented with a NAND gate 710. In the embodiment, the inverse of the reset signal (i.e., RESET*) is used.

The present invention enables the reduction of noise by using a semi-differential bus signaling scheme. This signaling scheme enables a significant portion of the conventionally lost window margin to be recovered. The implementation of the semi-differential scheme of this invention minimizes cost since, at most, one additional pin is needed. Simulated results show that the present invention increases speed by approximately twenty-five percent. Experimental results show an increase in speed of approximately thirty percent and an increase in the noise margin of fifty percent. Thus, the present invention increases both the noise margin and speed while minimizing additional system costs.

It will be appreciated by those of ordinary skill in the art having the benefit of this disclosure that numerous variations from the foregoing illustration will be possible without departing from the inventive concept described herein. Accordingly, it is the claims set forth below, and not merely the foregoing illustration, which are intended to define the exclusive rights of the invention.

What is claimed is:

1. A computer system comprising:
   a transmitter having a data output, a clock output and an inverted clock output; and
   a receiver having:
      a first comparator having a first input connected to the clock output and a second input connected to the inverted clock output;
      a second comparator having a third input connected to the data output and a fourth input connected to a reference voltage output;
      a third comparator having a fifth input connected to the inverted clock output and a sixth input connected to the clock output; and
      a retiming circuit having:
         a data input connected to an output of the second comparator; and
         a clock input connected to an output of the first comparator.

2. The computer system of claim 1 wherein the retiming circuit further comprises an inverted clock input connected to an output of the third comparator.

3. The computer system of claim 1 wherein the transmitter is one of a group consisting of a microprocessor, a memory controller, a video controller, and a peripheral component.

4. A computer system having a common bus, the computer system comprising:
   a first device that is one of a group consisting of a microprocessor and a chipset, the first device having a data output, a clock output, and an inverted clock output; and
   a second device that is one of the group consisting of a microprocessor and a chipset, the second device having:

a first comparator having a first input connected to the clock output and a second input connected to the inverted clock output;

a second comparator having a third input connected to the data output and a fourth input connected to a reference voltage output;

a third comparator having a fifth input connected to the inverted clock output and a sixth input connected to clock output; and a retiming circuit having:
  a data input connected to an output of the second comparator; and
  a clock input connected to an output of the first comparator.

5. The computer system of claim 4 wherein the retiming circuit further comprises an inverted clock input connected to an output of the third comparator.

6. The computer system of claim 4 wherein the first and second comparators are differential amplifiers.

7. The computer system of claim 4 wherein the data signal is synchronized to at least one of the clock signal and the inverted clock signal.

8. A computer system having a semi-differential bus signaling scheme, the computer system comprising:

a first device that is one of a group consisting of a microprocessor and a chipset, the first device having a data output, a clock output, and an inverted clock output; and a second device that is one of the group consisting of a microprocessor and a chipset, the second device having:
  a first differential amplifier having a first positive input connected to the clock output and a first negative input connected to the inverted clock output;
  a second differential amplifier having a second positive input connected to the inverted clock output and a second negative input connected to the clock output;
  a third differential amplifier having a third positive input connected to the data output and a third negative input connected to a reference voltage output; and
  a retiming circuit having:
    a data input connected to an output of the third differential amplifier;
    a clock input connected to an output of the first differential amplifier; and
    an inverted clock input connected to an output of the second differential amplifier.

9. The computer system of claim 8 wherein the first device includes a bus master.

10. The computer system of claim 8 wherein the data signal is synchronized to at least one of the clock signal and the inverted clock signal.

11. A computer system comprising:

a transmitter having a data output, a clock output, and an inverted clock output; and a receiver having:
  a first comparator having a first input connected to the clock output and a second input connected to the inverted clock output;
  a second comparator having a third input connected to the data output and a fourth input connected to a reference voltage output;
  a first reset capable latch having:
    a first reset input; and
    a clock input connected to an output of the first comparator;
  a retiming circuit having:
    a data input connected to an output of the second comparator; and
    a clock input connected to an output of the first reset capable latch.

12. The computer system of claim 11 further comprising a third comparator having a fifth input connected to the inverted clock output and a sixth input connected to the clock output.

13. The computer system of claim 12 further comprising a second reset capable latch having:
  a second reset input; and
  an inverted clock input connected to an output of the third comparator.

14. The computer system of claim 13 wherein the retiming circuit further comprises an inverted clock input connected to an output of the second reset capable latch.

15. The computer system of claim 11 wherein the first reset capable latch includes an inverter and a logic gate that is one of a group consisting of a NOR gate and a NAND gate.

* * * * *